United States Patent [19]

Erichsen

[11] Patent Number: 5,410,908
[45] Date of Patent: May 2, 1995

[54] MEASURING THE QUANTITY OF A GAS IN A TANK

[75] Inventor: Herman W. Erichsen, Holliston, Mass.

[73] Assignee: Data Instruments, Inc., Acton, Mass.

[21] Appl. No.: 170,399

[22] Filed: Dec. 20, 1993

[51] Int. Cl.$^6$ .......................... G01M 3/26; G01N 27/12
[52] U.S. Cl. .................................. 73/31.05; 73/25.01; 374/143
[58] Field of Search ................. 73/31.05, 23.2, 25.01, 73/25.05, 30.02; 374/54, 143

[56] References Cited

U.S. PATENT DOCUMENTS

| | | | |
|---|---|---|---|
| 3,665,756 | 5/1972 | Russell | 73/88.5 |
| 3,817,085 | 6/1974 | Stubbs | 73/23.2 |
| 4,327,350 | 4/1982 | Erichsen | 338/4 |
| 4,352,087 | 9/1982 | Wittmaier | 340/632 |
| 4,368,575 | 1/1983 | Erichsen | 29/610 |
| 4,393,686 | 7/1983 | Fengler | 73/31.05 |
| 4,480,252 | 10/1984 | Buonavita | 340/632 |
| 4,520,653 | 6/1985 | Kaiser | 73/31.05 |
| 4,545,255 | 10/1985 | Pugnaire | 73/726 |
| 4,766,763 | 8/1988 | Kurtz | 73/49.2 |
| 4,854,155 | 8/1989 | Poli | 73/31.05 |
| 5,179,523 | 1/1993 | Johnson | 73/23.2 |

OTHER PUBLICATIONS

Data sheets: Model AFFS-5; Model AFCP-1; CNG Fuel-Level Instrumentation Kits; P2ML Series CNG Fuel-Level Sensors, TSE Incorporated.
Brochure, WEMOS Gas-In-Oil Monitor, Westinghouse Electric Corporation, 1986.
Catalog, Figaro, Figaro Engineering Inc., Aug. 1990.
Brochure, Hydran 201R, Syprotec Inc. 1993.
E. D. Padgett and W. V. Wright, Silicon Piezoresistive Devices, Semiconductor and Conventional Strain Gage, Academic Press, 1962, p. 11.

Primary Examiner—Hezron E. Williams
Assistant Examiner—J. David Wiggins
Attorney, Agent, or Firm—Wolf, Greenfield & Sacks

[57] ABSTRACT

A sensing circuit includes a passive electrical network which has a first electrical property responsive to fluid pressure, and a second electrical property responsive to fluid temperature. A network output is responsive to the first property to a first extent, and to the second property to a second extent. The first and second extents are related in the same manner as a physical property of the fluid (other than its pressure or temperature) relates to its pressure and temperature. The network can include a strain gage that has a gage factor relating the pressure in the fluid to the first electrical property, and a temperature coefficient of gage factor responsive to the fluid temperature. The network can operate according to a gas law and indicate the amount of gas in a tank.

44 Claims, 4 Drawing Sheets

MEASURING THE QUANTITY OF A GAS IN A TANK

FIELD OF THE INVENTION

The present invention relates to the measurement of properties of a fluid, and more particularly to the measurement of a quantity of a gas in a tank.

BACKGROUND OF THE INVENTION

It is known to measure temperature using a variety of types of sensors, such as thermocouples and thermistors. It is also known to measure pressure using a variety of types of pressure sensors. In one type of pressure sensor, a diaphragm, which is under the influence of the pressure to be measured, actuates a beam bearing semiconductor strain gages. The beam and diaphragm are designed so that the strain in the beam is proportional to the pressure.

It is also known to place these strain gages in a Wheatstone bridge circuit. Compensation networks, such as thermistor-resistor combination compensation networks, have also been provided. These allow for uniform responses among sensors, and for temperature correction of the cells. Prior art sensors and circuitry are discussed in U.S. Pat. No. 4,327,350, entitled Pressure Transducer and U.S. Pat. No. 4,368,575 entitled Pressure Transducer-Method of Making Same. The contents of these patents are herein incorporated by reference.

The ideal gas equation:

$$PV = mRt$$

relates pressure (P) and volume (V) to the mass of a gas (m), which can be expressed in terms of a mole number (n), the gas constant (R), and absolute temperature (T). This equation can be used to determine the mass of a gas for a given pressure, volume, and temperature, for "ideal" gases. Where the behavior of a gas is non-ideal, the Van der Waal equation:

$$(P + (n^2 a/V^2))(V - bn) = RTn$$

may be used to calculate the quantity of a substance for a given volume, pressure and temperature.

SUMMARY OF THE INVENTION

In general, the invention features a sensing circuit that includes a passive electrical network having a first electrical property responsive to fluid pressure, and a second electrical property responsive to fluid temperature. A network output is responsive to the first property to a first extent, and to the second property to a second extent. The first and second extents are related in the same manner as a physical property of the fluid (other than its pressure or temperature) relates to its pressure and temperature. The network can include a strain gage that has a gage factor relating the pressure in the fluid to the first electrical property, and a temperature coefficient of gage factor responsive to the fluid temperature. The network can operate according to a gas law and indicate the amount of gas in a tank.

The invention can be particularly useful in monitoring the quantity of a gas in a storage tank or a fuel tank of a natural gas-powered vehicle. The measuring apparatus according to the invention can be made to be quite simple, and therefore relatively inexpensive, light, reliable, and easy to maintain.

DESCRIPTION OF THE PREFERRED EMBODIMENT

Figure 1:
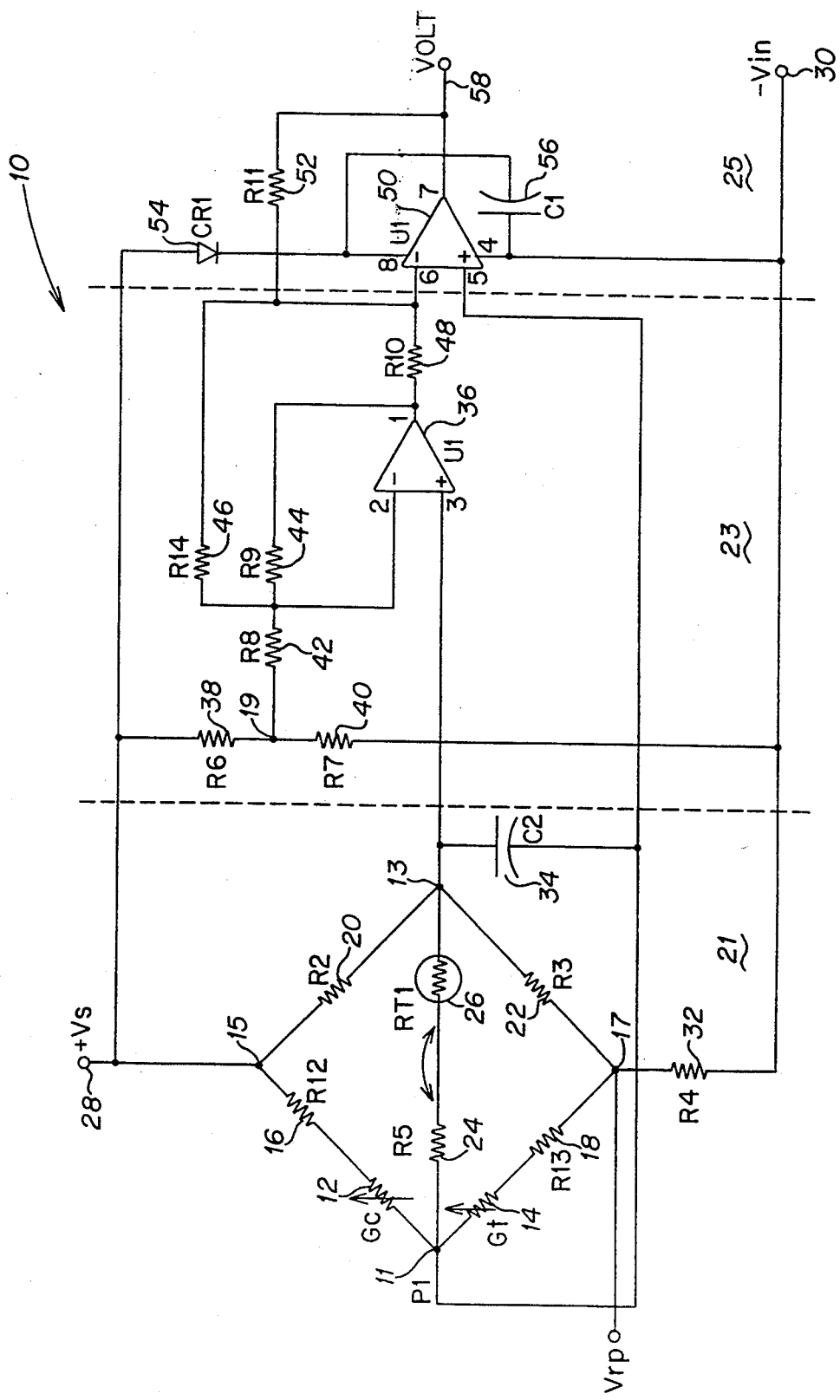
FIG. 1 is a schematic diagram of a typical circuit for measuring the quantity of gas in a tank.

The invention described in the present application can be implemented based on the beam-and-diaphragm-type sensors described in the above-referenced patents. (Making both temperature and pressure measurements using this type of sensor is described in a copending application entitled "Combined Temperature and Pressure Sensing" filed on the same day as the present application, and herein incorporated by reference.) Referring to FIG. 1, an exemplary gas quantity measurement circuit 10 according to the present invention incorporates first and second strain gages 12, 14. These are mounted on a beam, in such a way that increases in pressure cause tension of one of the gages and compression of the other. Changes in temperature tend to cause increases in the resistance of both of these strain gages.

The strain gages 12, 14 are selected for the temperature coefficient of their resistance and the temperature coefficient of their gage factor in order to roughly approximate one of the gas laws. This can be done by choice of the strain gage material characteristics, such as doping level and/or lattice orientation. In general, the temperature coefficients of resistance and gage factor are a function of doping level and crystal orientation.

The effect of semiconductor doping and lattice orientation on temperature coefficients is discussed in Silicon Piezoresistive Devices, Semiconductor and Conventional Strain Gage, by E. D. Padgett and W. V. Wright, Academic Press, 1962, which is herein incorporated by reference. As discussed below, the thermistor resistor combination can also be adjusted to more closely follow the characteristics of a specific gas.

In one embodiment, Silicon wafers are manufactured to a Boron doping concentration resulting in a resistivity of 0.12 to 0.15 ohms-cm and cut with an orientation along the <111> axis when mounted on 300 Series Silicon Substrate. The resulting temperature coefficient of resistance is approximately ±30%/100° F., and the temperature coefficient of gage factor is approximately −16%/100° F. Such wafers are available from Virginia Semiconductor Inc. of Fredericksburg, Va.

The strain gages 12, 14 are connected in two adjacent branches of a Wheatstone bridge circuit 21. A first zero compensation resistor 16 is connected in series with the first strain gage 12 in a first branch of the Wheatstone bridge, and a second zero compensation resistor 18 is mounted in series with the second strain gage 14 in a second branch of the Wheatstone bridge. A first balance resistor 20 and a second balance resistor 22 are connected in series between the first and second branches to form the third and fourth branches of the Wheatstone bridge. If required, a span compensation resistor 24 and a span compensation thermistor 26 are connected in series from a node 11 between the two strain gages to a node 13 between the first and second balance resistors.

A node 15 between the first zero compensation resistor 16 and the first zero balance resistor 20 is connected to a positive voltage supply rail 28. A node 17 between the second zero compensation resistor 18 and the second balance resistor 22 is connected to a negative supply rail 30 via a series resistor 32. The node 11 between the two strain gages 12, 14 is a first output of the Wheatstone bridge circuit 21. The node 13 between the first and second zero balance resistors 20, 22 is a second output of the bridge circuit. The node 17 between the second zero compensation resistor 18 and the second balance resistor 22 is a test point for use in trimming the bridge circuit only. A first capacitor 34 is connected between the first and second outputs of the Wheatstone bridge circuit.

The Wheatstone bridge circuit 21 is followed by a first operational amplifier stage 23, which includes a first operational amplifier 36. This stage also includes a voltage divider made up of a first voltage divider resistor 38 and a second voltage divider resistor 40 connected in series between the positive supply rail 28 and the negative supply rail 30. An input resistor 42 is tied to a node 19 separating the two voltage divider resistors and the inverting input of the first operational amplifier. A first feedback resistor 44 is connected between the inverting input of the first operational amplifier and the output of the first operational amplifier. An output resistor 48 is connected between the output of the first operational amplifier and a second feedback resistor 46, which is, in turn, connected to the inverting input of the first operational amplifier. The input of the first operational amplifier stage is the noninverting input of the first operational amplifier, and it is connected to the first output of the Wheatstone bridge circuit. The output of the first operational amplifier stage is the node connecting the output resistor and the second feedback resistor.

A second amplifier stage 25 includes a second operational amplifier 50 and a feedback resistor 52 connected between its inverting input and its output. This second operational amplifier preferably shares a package with the first operational amplifier in a dual-op amp configuration. The positive power supply line of the operational amplifiers is connected to the positive supply rail 28 via a diode 54. The negative power supply line of the operational amplifier is connected to the negative supply rail 30. A second capacitor 56 is connected between the positive and negative power supply lines of the second operational amplifier.

The second operational amplifier stage 25 receives the output of the first operational amplifier stage 23 at the inverting input of the second operational amplifier 50. The second operational amplifier stage also receives the first output of the Wheatstone bridge circuit 21, at the noninverting input of the second operational amplifier. The output 58 of the gas measuring circuit 10 is the output of the second operational amplifier. Together, the two amplifier stages form a linear instrumentation amplifier. In one embodiment, the amplifier has an overall gain of 100.

In operation of the gas quantity measurement circuit 10, the first and second strain gages 12, 14 respond to changes in pressure in equal and opposite ways. In particular, increases in pressure cause the first strain gage to be compressed, which in turn causes its electrical resistance to decrease. Conversely, the increases in pressure result in tension in the second strain gage, thereby increasing its electrical resistance.

The combined changes in resistance of the two strain gages 12, 14 will cause the potential at the node 11 between the two strain gages to be increased in response to an increase in pressure. The potential at the node 13 between the first and second balance resistors will not change, however, and therefore the potential difference between the first and second outputs of the Wheatstone bridge circuit 21 will increase.

Increases in temperature, on the other hand, will cause the resistance of both the first and second strain gages 12, 14 to increase. This increase will have little effect on the voltage at both the node 11 between the two strain gages at the node 13 between the two balance resistors, as the series resistor 32 is quite small. The negative temperature coefficient of gage factor, however, will make the strain gages less sensitive to pressure at higher temperatures. This will temperature compensate the potential between the first and second outputs of the bridge 21 to follow one of the gas laws. This temperature-modified pressure measurement signal is amplified by the gain of the amplifier, and the resulting output voltage can be used as an indication of "tank level" (e.g., to drive a panel meter or the like).

This circuit is designed to compensate the transducer's pressure sensitivity vs. temperature characteristic to be the inverse of the gas law equation for the specific gas being measured. This compensation is performed primarily by gage selection, and secondarily by selection of the span compensation resistor 24 and the thermistor 26, according to the following discussion.

The ideal gas equation for a fixed tank is:

$$PV_{tk} = mRT_{ab}$$

where:
P is the tank pressure, $V_{tk}$ is the tank volume, m is the mass of the gas, R is the gas constant, and $T_{ab}$ is the absolute temperature of the tank. Since the tank volume and the gas constant are both constant, the mass of the gas is proportional to the pressure and inversely proportional to the absolute temperature. The output of the transducer can then be compensated to be:

$$E_o = P*S(T)$$

where S(T) is the sensitivity of the device as a function of temperature. S(T) is compensated so that $E_o$ is directly proportional to m or the tank "level". This compensation can be based on a specific pressure at a specific temperature being the definition of full, and a sensor compensated in this manner can have an analog output which is directly proportional to the mass of the gas in the tank.

For a real gas, the Van der Waal equation may be used, in place of the ideal gas equation. In particular, the Van der Waal equation:

$$(P(N_2 a/V_2))(V-BN) = RTn$$

has solution(s) for pressure:

$$P = -(N^2(a/V) - N^3(a/V^2)b - RTn)/(V - bn)$$

In the case of methane, a=2.253 liter$^2$*ATM/mole$^2$, b=0.04287 liter/mole, and R=0.08206 liter*ATM/(mole*deg).

Figure 2:
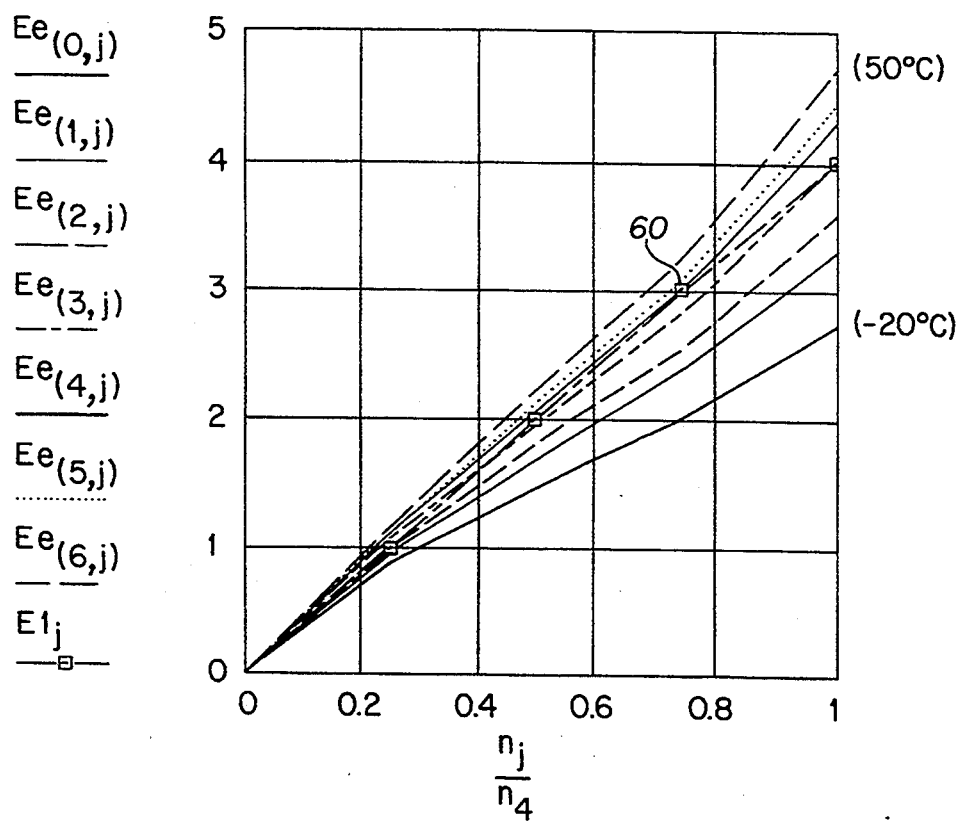
FIG. 2 is a plot showing the response of a sensor to pressure, for a series of temperatures.
Figure 3:
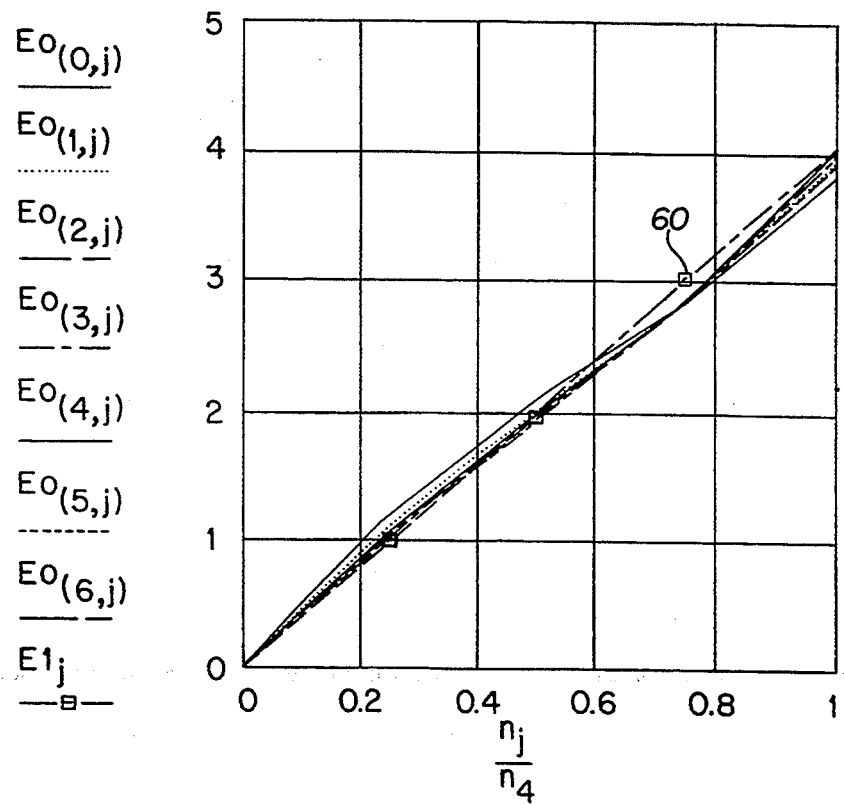
FIG. 3 is a plot showing the response of the same sensor in combination with circuitry according to FIG. 1.

In one example, a full tank is defined as 3,000 psi at 298° K., and the amount of gas in this tank when it is full at this temperature and pressure is taken to be 5 moles. For this exemplary system, referring to FIGS. 2 and 3, the theoretical curve 60 presents the ideal sensitivity curve using the above example and the Van der Waal's equation. In FIG. 2, this curve is shown along side a series of curves for an uncompensated pressure transducer. It can be seen from this graph that such a sensor would provide different tank level measurements at different temperatures. In FIG. 3, however, the same ideal curve 60 is shown with the theoretical result of compensation with the circuit of FIG. 1. As can be seen in this graph, tank level measurements are relatively insensitive to temperature.

Figure 4:
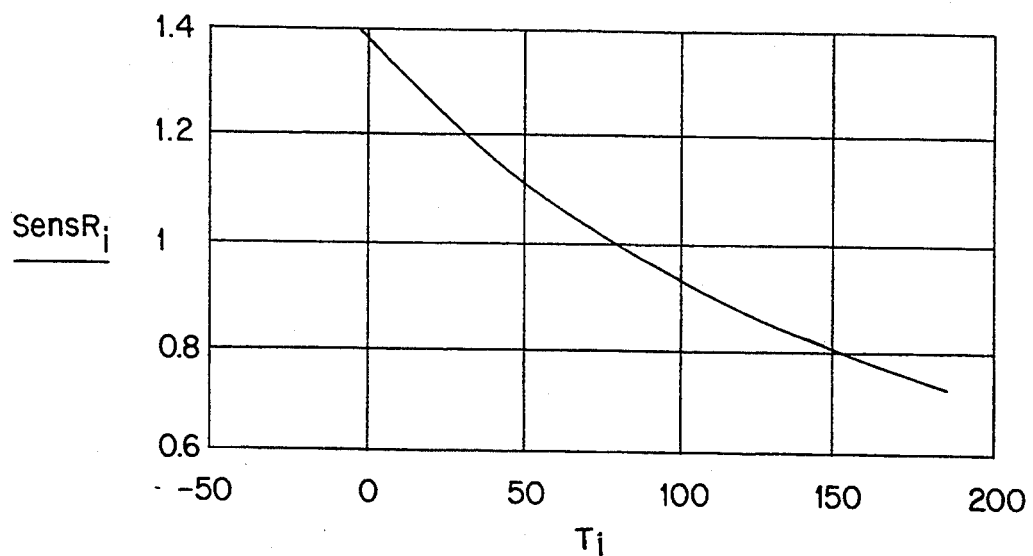
FIG. 4 is a plot of desired span compensation for the circuit of FIG. 1 for methane.
Figure 6:
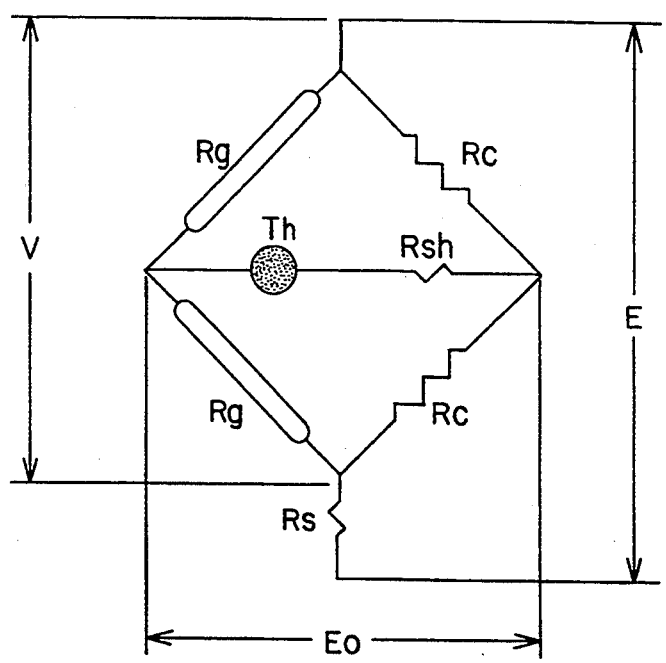
FIG. 6 is a generalized schematic of a Wheatstone bridge circuit.

The resulting desired sensor temperature sensitivity is shown in FIG. 4. This desired span compensation curve can be closely matched using a quadratic fitting procedure. In particular, referring to FIG. 6, the temperature dependence of a typical silicon gage used in this type device can be closely approximated by the following equations:

$$S = AsT^2 + BsT + Cs$$

where: S=sensitivity (gage factor) of the gages referenced to the sensitivity at 80° F., T=operating temperature, As=1.93 10$^{-6}$, Bs=2.3 10$^{-3}$, Cs=1.172 (A, B, and C can be varied by adjusting the doping of the strain gages);

$$S_n = As(T) + BsT_n + Cs$$

and $$Kg = ArT + BrT + Cr$$

where: Kg=ratio of the gage resistance referenced to resistance at 80° F. (=R/Rgo), Ar=5.839 10$^{-6}$, Br=2.56 10$^{-3}$ coefficients of specific silicon gage, Cr=0.7577; and $$Kg_n = Ar(T_n) + BrT_n + Cr$$

where: Kg=the ratio of the resistance at the operating temperature to the resistance at 80° F. (Rgo), Rgo=1000 (resistance at 80° F.), and Rg$_n$=RgoKg$_n$ (resistance at operating temperature (T)).

For a typical gage type as described above (Sn, Kg, etc.). The circuit components shown in FIG. 6 would be:

Rc=20000 ohms—typical completion resistance
Tho=5000 Thermistor resistance in ohms at 77° F.
β=3400 Temperature coefficient of thermistor
Rsh=22000 ohms typical
Rs=50.

Rs is used as part of the compensation test procedure. By measuring the voltage across Rs during the test and calibrate procedure calculations can be made to insure that the A, B, C coefficients are correct for both sensitivity and resistance. Rs is kept as small as possible to limit its effect on sensitivity. The thermistor resistance at a given temperature T is then given by:

$$Th_n := Tho \cdot \exp\left[\beta \cdot \left[\frac{1}{\left[273 + 5 \cdot \frac{(T_n - 32)}{9}\right]} - \frac{1}{298}\right]\right]$$

And Sc, the compensated pressure sensitivity at temperature T, equals:

$$Sc_n := 4 \cdot (Th_n + Rsh) \cdot Rc \cdot S_n \cdot$$

$$\frac{Rg_n}{((2 \cdot Th_n + 2 \cdot Rsh + Rc + Rg_n) \cdot (2 \cdot Rg_n \cdot Rc + Rs \cdot Rc + Rs \cdot Rg_n))}$$

The relative sensitivity referenced to T=80 is given by:

$$SensR_n = Sc_n/Sc_3$$

Figure 5:
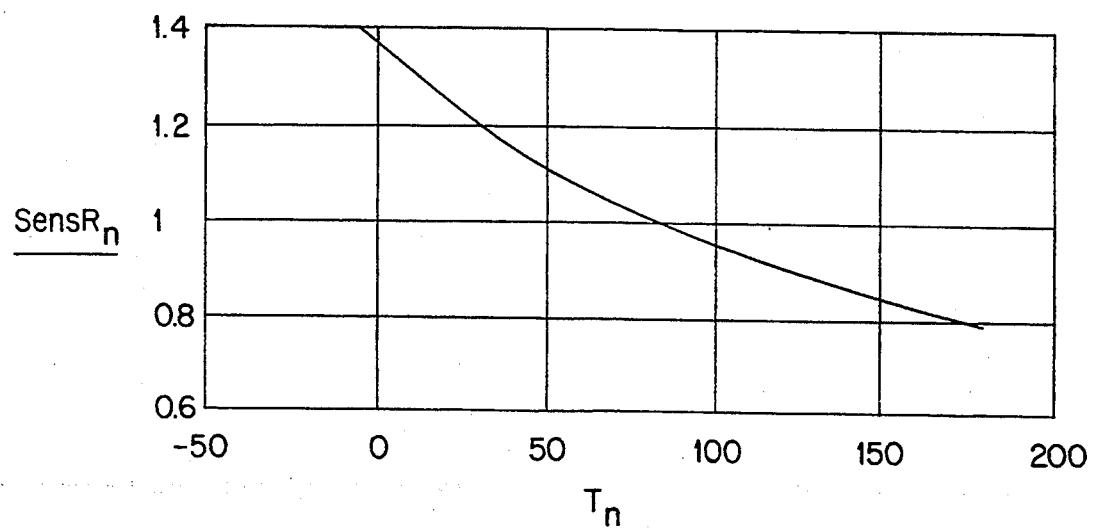
FIG. 5 is a calculated plot of relative sensitivity for a sensor, compensated with circuitry according to FIG. 1.
Figure 7:
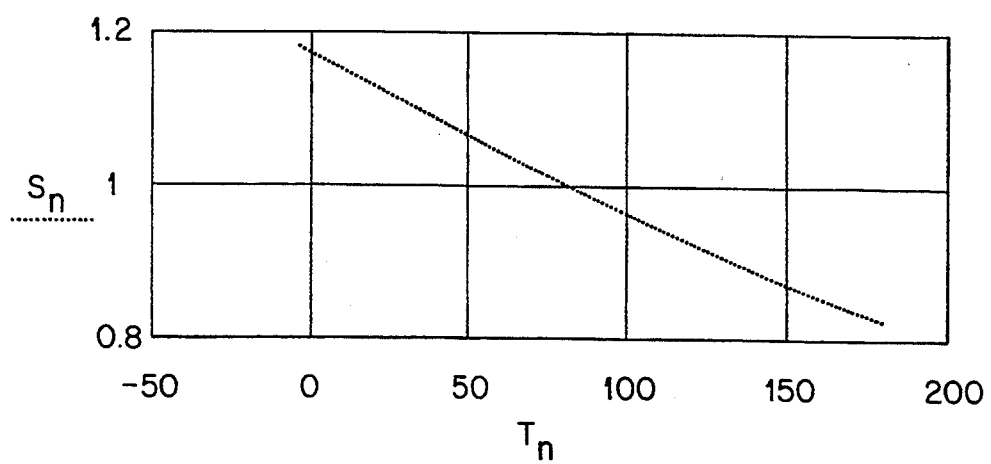
FIG. 7 is a plot of relative sensitivity versus temperature of a sensor compensated using a quadratic fitting procedure.

A plot of the calculated relative sensitivity versus temperature T is shown in FIG. 5. This compares relatively well with the desired compensation curve shown in FIG. 4 for Methane gas. It is noted that tank level measurement accuracy to ±5% is more than adequate for most applications. A graph of the resulting gage sensitivity with temperature is shown in FIG. 7.

It is also possible to fit the sensor response to desired characteristics obtained from tabulations of data for a particular gas (i.e., using an empirical gas law). For example, compressibility factors defined by the American Gas association Report #8 and its included computer program listing can be used. This report provides information on the properties of the mixtures of gases that are sold as "Natural Gas", which mixtures vary geographically within the United States. Use of these tables can result in better accuracies, which may be required in certain applications.

The compensation therefore takes advantage of the normal negative slope of the gage sensitivity of a silicon strain gage. Additional non-linear compensation, if required, is achieved using the Thermistor (Th), resistor (Rsh) combination. The above-described technique can be used with any type of semiconductor pressure sensor having the proper temperature dependence of its piezoresistive characteristics. For example, it is possible to use bonded semiconductor strain gages, pressure transducers or micro machined chip-type pressure sensors. This technique can also be used in other applications where there is a temperature-pressure dependence of a physical property to be measured for a fluid. For example, the technique may be used for flow measurement (filters, etc., where viscosity change due to temperature must be taken into account), compression controls (to compensate for temperature changes due to expansion and compression of the gases), and refrigeration (to measure state of the refrigerant at a specific point in the cycle).

While there have been shown and described what are at present considered the preferred embodiments of the present invention, it will be obvious to those skilled in the art that various changes and modifications may be made therein without departing from the scope of the invention as defined by the appended claims.

What is claimed is:

1. A sensing circuit, comprising a passive electrical network having a first electrical property responsive to a pressure in a fluid and having a second electrical property responsive to a temperature in the fluid, the passive network having an electrical network output responsive to the first and second electrical properties to a first and second extent respectively, the first and second extents being related to each other in the same manner as a physical property of the fluid, other than the pressure in the fluid or the temperature in the fluid, relates to the pressure in the fluid and the temperature in the fluid, said physical property of the fluid varying both in response to changes in the temperature in the fluid and to changes in the pressure in the fluid.

2. The sensing circuit of claim 1 wherein the passive electrical network includes at least one strain gage responsive to the pressure in the fluid and wherein the electrical network output is responsive to the strain gage.

3. The sensing circuit of claim 2 wherein the passive electrical network further includes a thermistor responsive to the temperature in the fluid and wherein the electrical network output is responsive to the thermistor.

4. The sensing circuit of claim 1 wherein the passive electrical network includes a plurality of strain gages responsive to the pressure in the fluid and wherein the electrical network output is responsive to the strain gages.

5. The sensing circuit of claim 1 comprising a common sensing element responsive to both the pressure in the fluid and the temperature in the fluid, and having both the first and second properties, and wherein the electrical network output is responsive to the sensing element.

6. The sensor of claim 1 wherein the sensing circuit comprises a pressure sensing element connected in the passive electrical network and responsive to the pressure in the fluid, wherein the first electrical property is a property of the pressure sensing element, wherein the pressure sensing element has a gage factor relating the pressure in The fluid to the first electrical property, wherein the pressure sensing element has a temperature coefficient of gage factor responsive to the temperature of fluid, wherein the gage factor is the second electrical property, and wherein the passive network electrical output is responsive to the pressure sensing element.

7. The sensing circuit of claim 6 wherein the sensing element is a strain gage and wherein the first property is a resistance of the strain gage.

8. The sensing circuit of claim 7 wherein the passive electrical network further includes a thermistor responsive to the temperature in The fluid and wherein the electrical network output is responsive to the thermistor.

9. The sensing circuit of claim 7 further including a second strain gage connected in the passive electrical network and wherein The first and second strain gages are both mounted on the same member.

10. The sensing circuit of claim 6 wherein the sensing element is a semiconductor strain gage.

11. The sensor of claim 6 wherein the passive electrical network includes a pair of strain gages mounted on a beam, which beam is responsive to the pressure in the fluid, wherein the strain gages are located in two adjacent branches of a Wheatstone bridge, wherein the passive electrical network includes first and second resistors mounted in the remaining branches of the bridge, and wherein the passive electrical network output is responsive to the strain gages.

12. The circuit of claim 10 wherein the passive electrical network further includes fourth and fifth resistors in series with the first and second strain gages respectively.

13. A sensor, comprising:
a sensor housing constructed and adapted to be mounted in a single opening in a vessel wall,
an electrical output terminal located on the housing, and
an electrical network housed in the housing and electrically connected to the electrical output terminal, the electrical network having a first electrical property responsive to a pressure in a fluid and having a second electrical property responsive to a temperature in the fluid, the electrical output terminal being responsive to the first and second electrical properties to a first and second extent respectively, the first and second extents being related to each other in the same manner as a physical property of the fluid other than the pressure in the fluid or the temperature in the fluid, relates to the pressure in the fluid and the temperature in the fluid, said physical property of the fluid varying both in response to changes in the temperature in the fluid and to changes in the pressure in the fluid, and wherein the electrical network complies a common sensing element responsive to both the pressure in the fluid and the temperature in the fluid and having both the first and second properties and wherein the output is responsive to ambient conditions at the common sensing element.

14. The pressure sensor of claim 13 wherein the circuitry includes a strain gage responsive to the pressure in the fluid and wherein the electrical network output is responsive to the strain gage.

15. A sensing circuit, comprising:
passive circuit means comprising:
temperature sensing means for sensing a temperature in the fluid,
pressure sensing means for sensing a pressure in the fluid, and
output terminal means responsive to the pressure sensing means, and responsive to the temperature sensing means, for providing an electrical signal proportional to a physical property of the fluid other than the temperature or pressure in the fluid according to the temperature sensing means and the pressure sensing means, said physical property of the fluid varying both in response to changes in the temperature in the fluid and to changes in the pressure in the fluid.

16. The sensing circuit of claim 15 wherein the pressure sensing means and the temperature sensing means comprise a common means.

17. A measuring method for a fluid, comprising:
sensing pressure in the fluid using a sensing element,
sensing temperature in the fluid using the same sensing element, and
providing an analog voltage indicative of a value of a physical property of the fluid other than the temperature in the fluid or the pressure in the fluid, based on the step of sensing pressure in the fluid and the step of sensing temperature in the fluid, said physical property of the fluid varying both in response to changes in the temperature in the fluid and to changes in the pressure in the fluid.

18. The method of claim 17 wherein the step of sensing temperature in the fluid and the step of sensing pressure in the fluid employ a semiconductor strain gage.

19. The method of claim 17 wherein the step of sensing temperature in the fluid affects the sensitivity of the step of sensing pressure in the fluid.

20. The method of claim 17 wherein the step of sensing temperature in the fluid, the step of sensing pressure in the fluid, and the step of providing an analog voltage employ only passive circuit elements.

21. A sensing circuit, comprising a passive electrical network having a first electrical property responsive to a pressure in a fluid and having a second electrical property responsive to a temperature in the fluid, the passive network having an electrical network output responsive to the first and second electrical properties to a first and second extent respectively, the first and second extents being related to each other in the same manner as a physical property of the fluid, other than the pressure in the fluid or the temperature in the fluid, relates to the pressure in the fluid and the temperature in the fluid, and wherein the first and second extents are related according to a gas law that models real gas behavior.

22. The sensing circuit of claim 21 wherein the passive electrical network includes at least one strain gage responsive to the pressure in the fluid and wherein the electrical network output is responsive to the strain gage.

23. The sensing circuit of claim 22 wherein the passive electrical network further includes a thermistor responsive to the temperature in the fluid and wherein the electrical network output is responsive to the thermistor.

24. The sensing circuit of claim 21 wherein the passive electrical network includes a plurality of strain gages responsive to the pressure in the fluid and wherein the electrical network output is responsive to the strain gages.

25. The sensing circuit of claim 21 comprising a common sensing element responsive to both the pressure in the fluid and the temperature in the fluid, and having both the first and second properties, and wherein the electrical network output is responsive to the sensing element.

26. The sensor of claim 21 wherein the sensing circuit comprises a pressure sensing element connected in the passive electrical network and responsive to the pressure in the fluid, wherein the first electrical property is a property of the pressure sensing element, wherein the pressure sensing element has a temperature coefficient of gage factor relating the pressure in the fluid to the first electrical property, wherein the pressure sensing element has a temperature coefficient of gage factor responsive to ambient conditions at the temperature of the fluid, wherein the gage factor is the second electrical property, and wherein the passive network electrical output is responsive to the pressure sensing element.

27. The sensing circuit of claim 26 wherein the sensing element is a strain gage and wherein the first property is a resistance of the strain gage.

28. The sensing circuit of claim 27 wherein the passive electrical network further includes a thermistor responsive to the temperature in the fluid and wherein the electrical network output is responsive to the thermistor.

29. The sensing circuit of claim 27 further including a second strain gage connected in the passive electrical network and wherein the first and second strain gages are both mounted on the same member.

30. The sensing circuit of claim 29 wherein the first and second extents are related according to the ideal gas law.

31. The sensing circuit of claim 29 wherein the first and second extents are related according to the Van der Waal gas law.

32. The sensing circuit of claim 29 wherein the first and second extents are related according to empirical data on a particular gas.

33. The sensing circuit of claim 26 wherein the sensing element is a semiconductor strain gage.

34. The sensor of claim 26 wherein the passive electrical network includes a pair of strain gages mounted on a beam, which beam is responsive to the pressure in the fluid, wherein the strain gages are located in two adjacent branches of a Wheatstone bridge, wherein the passive electrical network includes first and second resistors mounted in the remaining branches of the bridge, and wherein the passive electrical network output is responsive to the strain gages.

35. The circuit of claim 34 wherein the passive electrical network further includes fourth and fifth resistors in series with The first and second strain gages respectively.

36. A sensor, comprising:
a sensor housing constructed and adapted to be mounted in a single opening in a vessel wall,
an electrical output terminal located on the housing, and
an electrical network housed in the housing and electrically connected to the electrical output terminal, the electrical network having a first electrical property responsive to a pressure in a fluid and having a second electrical property responsive to a temperature in the fluid, the electrical output terminal being responsive to the first and second electrical properties to a first and second extent respectively, the first and second extents being related to each other in the same manner as a physical property of the fluid, other than the pressure in the fluid or the temperature in the fluid, relates to the pressure in the fluid and the temperature in the fluid, and wherein the first and second extents are related according to a gas law.

37. The pressure sensor of claim 36 wherein the circuitry includes a strain gage responsive to the pressure in the fluid and wherein the electrical network output is responsive to the strain gage.

38. The sensor of claim 36 wherein the electrical network comprises a common sensing element responsive to both the pressure in the fluid and the temperature in the fluid and having both the first and second properties and wherein the output is responsive to the common sensing element.

39. A sensing circuit, comprising:
passive circuit means for measuring the quantity of a gas, comprising:
temperature sensing means for sensing a temperature in the fluid,
pressure sensing means for sensing a pressure in the fluid, and
output terminal means responsive to the pressure sensing means, and responsive to the temperature sensing means, for providing an electrical signal proportional to a physical property of the fluid, other than the temperature or pressure in the fluid, according to the pressure sensing means and the temperature sensing means.

40. The sensing circuit of claim 39 wherein the pressure sensing means and the temperature sensing means comprise a common means.

41. A measuring method for a fluid, comprising:
sensing pressure in the fluid using a sensing element,
sensing temperature in the fluid using the same sensing element, and
providing an analog voltage indicative of a value of a physical property of the fluid, other than the temperature in the fluid or the pressure in the fluid, based on the step of sensing pressure in the fluid and the step of sensing temperature in the fluid, wherein the step of providing an analog voltage proceeds according to a gas law.

42. The method of claim 41 wherein the step of sensing temperature in the fluid and the step of sensing pressure in the fluid employ a semiconductor strain gage.

43. The method of claim 41 wherein the step of sensing temperature in the fluid affects the sensitivity of the step of sensing pressure in the fluid.

44. The method of claim 41 wherein the step of sensing temperature in the fluid, the step of sensing pressure in the fluid, and the step of providing an analog voltage employ only passive circuit elements.

* * * * *